US010138985B2

(12) United States Patent
Iwasaki

(10) Patent No.: US 10,138,985 B2
(45) Date of Patent: Nov. 27, 2018

(54) DEFLECTOR FOR BALL SCREW MECHANISM AND BALL SCREW MECHANISM

(71) Applicant: KURODA PRECISION INDUSTRIES LTD., Kanagawa (JP)

(72) Inventor: Yoshimi Iwasaki, Kanagawa (JP)

(73) Assignee: Kuroda Precision Industries Ltd., Kanagawa (JP)

( * ) Notice: Subject to any disclaimer, the term of this patent is extended or adjusted under 35 U.S.C. 154(b) by 0 days.

(21) Appl. No.: 15/507,827

(22) PCT Filed: Oct. 1, 2014

(86) PCT No.: PCT/JP2014/005016
§ 371 (c)(1),
(2) Date: Mar. 1, 2017

(87) PCT Pub. No.: WO2016/051434
PCT Pub. Date: Apr. 7, 2016

(65) Prior Publication Data
US 2017/0292591 A1    Oct. 12, 2017

(51) Int. Cl.
*F16H 25/22* (2006.01)
*F16H 25/24* (2006.01)

(52) U.S. Cl.
CPC ......... *F16H 25/2219* (2013.01); *F16H 25/24* (2013.01); *F16H 25/2214* (2013.01)

(58) Field of Classification Search
CPC .............................. F16H 25/2219; F16H 25/24
See application file for complete search history.

(56) References Cited

U.S. PATENT DOCUMENTS

| 4,905,534 A * | 3/1990 | Andonegui ......... F16H 25/2223 74/424.87 |
| 6,561,053 B2 * | 5/2003 | Greubel .............. F16H 25/2219 74/424.82 |
| 8,640,564 B2 * | 2/2014 | Lee ..................... F16H 25/2219 74/424.82 |

(Continued)

FOREIGN PATENT DOCUMENTS

| EP | 1132651 | 9/2001 |
| JP | 2001280439 | 10/2001 |

(Continued)

OTHER PUBLICATIONS

International Search Report, PCT/JP2014/005016, dated Dec. 22, 2014, 3 pages.

(Continued)

*Primary Examiner* — Zakaria Elahmadi
(74) *Attorney, Agent, or Firm* — Dority & Manning, P.A.

(57) ABSTRACT

In a multi-piece deflector for a ball screw mechanism, the positioning precision of a tongue with respect to a ball rolling passage can be improved, balls can be recirculated in a proper manner at all times, and damages to the tongue can be avoided. A deflector main body (40) which is fitted to the nut (7) is provided with a tongue (50) and a main body side ball guide groove (51) defining a part of a circular cross section, and a component piece (60) which is fitted to the deflector main body (40) is provided with a component piece side ball guide groove (68) defining a remaining part of the circular cross section.

6 Claims, 12 Drawing Sheets

(56) References Cited

U.S. PATENT DOCUMENTS

| | | | |
|---|---|---|---|
| 8,739,646 B2* | 6/2014 | Nishimura | F16H 25/2247 74/424.87 |
| 2001/0022110 A1* | 9/2001 | Roland | F16H 25/2214 74/424.87 |
| 2001/0025540 A1 | 10/2001 | Greubel | |
| 2008/0190230 A1* | 8/2008 | Liao | F16H 25/2214 74/424.83 |
| 2009/0249911 A1* | 10/2009 | Michioka | F16H 25/2214 74/424.87 |
| 2009/0293658 A1* | 12/2009 | Michioka | F16H 25/2219 74/424.87 |
| 2010/0058885 A1* | 3/2010 | Uesugi | F16O 33/3706 74/424.89 |
| 2013/0055839 A1 | 3/2013 | Pan et al. | |
| 2016/0207566 A1* | 7/2016 | Ito | B62D 5/0448 |

FOREIGN PATENT DOCUMENTS

| | | |
|---|---|---|
| JP | 2008128388 | 6/2008 |
| JP | 2008291901 | 12/2008 |
| JP | 4303734 | 7/2009 |
| JP | 2012072916 | 4/2012 |

OTHER PUBLICATIONS

Supplementary European Search Report for PCT/JP2014/005016 dated May 4, 2018, 9 pages.

* cited by examiner

DEFLECTOR FOR BALL SCREW MECHANISM AND BALL SCREW MECHANISM

CROSS REFERENCE TO RELATED APPLICATIONS

This application is the U.S. National Stage entry of International Application Number PCT/JP2014/005016 filed under the Patent Cooperation Treaty having a filing date of Oct. 1, 2014, the disclosure of which is hereby incorporated by reference herein in its entirety for all purposes.

TECHNICAL FIELD

The present invention relates to a deflector for a ball screw mechanism and a ball screw mechanism, and in particular to a deflector fitted into a nut of a ball screw mechanism for guiding balls from a ball rolling passage to a ball return passage formed in the nut, and a ball screw mechanism using such a deflector.

BACKGROUND ART

The ball screw mechanism is widely used as a feed screw, and is provided with a ball rolling passage defined by a thread groove formed around a screw shaft and a corresponding thread groove formed on the inner circumferential surface of a nut, and a plurality of balls (steel balls) that roll along the ball rolling passage. In such a ball screw mechanism, it is necessary to recirculate the balls in the ball rolling passage, and a deflector system using a deflector fitted into the nut is known as one of the systems for recirculating the balls. The deflector typically includes a tongue extending into the ball rolling passage for scooping up the balls from the ball rolling passage and a ball guide passage for guiding the balls scooped up by the tongue into a ball return passage formed in the nut.

The ball guide passage consists of a direction changing passage that bends in the shape of letter L to receive the balls from the tongue in the circumferential direction of the nut, and pass the balls to the ball return passage extending in the axial direction. Owing to this bent configuration, the deflector is typically formed by two pieces jointly defining the ball guide passage so that the molded products may be easily removed from the mold when manufacturing the deflector by casting metal or molding plastic material. (See Patent Documents 1 and 2, for example.) The deflector formed as an assembly of two pieces may be referred to as a multi-piece deflector.

PRIOR ART DOCUMENT(S)

Patent Document(s)

Patent Document 1: JP2012-72916A
Patent Document 2: EP1132651B1

SUMMARY OF THE INVENTION

Task to be Accomplished by the Invention

The positioning precision of the tongue with respect to the ball rolling passage is highly important for the deflector of a ball screw mechanism. If the positional precision is not adequate, the tip of the tongue is displaced from the optimum position with respect to the ball rolling passage so that the balls cannot be properly scooped up from the ball rolling passage, and/or the balls may collide with the tip of the tongue. In such events, the balls may not be properly recirculated, and/or the tongue may be damaged.

When the deflector is made of two pieces, for the deflector to be positioned properly with respect to the ball rolling passage, it is necessary not only to precisely position the deflector with respect to the nut but also to precisely assemble together the two pieces that jointly form the deflector because either the two pieces that are precisely positioned relative to each other are fitted into a proper position in the nut, or a larger one of the two pieces is fitted into a proper position in the nut, and the remaining smaller piece formed with a tongue is then fitted into a proper position in the larger piece. Therefore, the tongue can be precisely positioned with respect to the ball rolling passage only if the deflector is precisely positioned with respect to the nut, and, in addition, the two pieces are precisely assembled to each other. In other words, as there are two factors that could compromise the positioning accuracy of the tongue with respect to the ball rolling passage, a considerable effort is required to achieve a desired level of precision in positioning the tongue with respect to the ball rolling passage.

In view of such problems of the prior art, a primary object of the present invention is to provide a multi-piece deflector in which the positioning precision of the tongue with respect to the ball rolling passage can be improved, the balls can be recirculated in a proper manner at all times, and damages to the tongue can be avoided.

Means for Accomplishing the Task

To achieve such an object, the present invention provides a deflector (13) for a ball screw mechanism having a ball rolling passage (5) defined by a thread groove (2) formed on an outer circumferential surface of a screw shaft (3) and a thread groove (6) formed on an inner circumferential surface of a nut (7), the deflector (13) being configured to be fitted into the nut (7) to guide a plurality of balls (8) from the ball rolling passage (5) to a ball return passage (12) formed in the nut (7), the deflector (13) comprising: a deflector main body (40) having a tongue (50) extending toward the ball rolling passage (5) for scooping up the balls (8) from the ball rolling passage (5), and a main body side ball guide groove (51) for defining a part of a ball guide passage (70) for guiding the balls (8) scooped up by the tongue (50) to the ball return passage (12), the deflector main body (40) being configured to be fitted to a prescribed position of the nut (7) by engaging with a part of the nut (7); and a component piece (60) having a component piece side ball guide groove (68) defining a remaining part of the ball guide passage (70) to define the ball guide passage (70) jointly with the main body side ball guide groove (51), the component piece (60) being configured to be fitted to a prescribed position of the deflector main body (40) by engaging with a part of the deflector main body (40).

According to this arrangement, because the tongue (50) is integrally formed with the deflector main body (40) which is directly fitted to the nut (7), any positional error that may be created owing to the assembly process between the deflector main body (40) and the component piece (60) is prevented from affecting the positional precision of the tongue (50) relative to the nut (7). Thereby, the positional precision of the tongue (50) relative to the ball rolling passage (5) can be improved.

Preferably, the deflector main body (40) and the component piece (60) are configured to be joined in an axial direction of the nut (7). Such a deflector (13) is particularly favorable to applications where the deflector (13) is fitted to the nut (7) by inserting the deflector (13) into a receiving hole (14) opening out at the outer circumferential surface (7a) of the nut (7) in a radially inward direction of the nut (7).

Preferably, the deflector (13) is provided with a pair of mutually parallel side surfaces facing in the axial direction of the nut (7), and one of the side surfaces is defined solely by the deflector main body (40) while the other side surface is jointly defined by the deflector main body (40) and the component piece (60) as a flush surface such that the component piece (60) is held immobile in the axial direction of the nut (7) by being interposed between the nut (7) and the deflector main body (40) in the receiving hole (14).

According to this arrangement, no special fixing member or a fixing mechanism is required for fixedly securing the component piece (60).

According to a preferred embodiment of the present invention, a circular opening jointly defined by the main body side ball guide groove (51) and the component piece side guide groove (68) opens out at one side surface of the deflector (13) facing in the axial direction of the nut (7) as a junction with the ball return passage (12), and the component piece (60) is provided with a radially outwardly extending part (66, 67) with respect to the circular opening at a portion adjoining the circular opening so that the deflector main body (40) and the component piece (60) abut each other by an interface extending radially outward with respect to the circular opening.

According to this arrangement, the shape of the opening serving as a junction with the ball return passage (12) can be accurately determined, and the positioning of the component piece (60) with respect to the deflector main body (40) can be accomplished in a proper manner.

Preferably, the tongue (50) is provided with an arcuate cross section, and a midpoint (M) of an arcuate configuration of the tongue (50) is offset toward a side remote from an open end of the main body side ball guide groove (51).

According to this arrangement, the overhang of a part of the tongue (50) located on the side of the first side surface (45) owing to the arcuate configuration of the tongue (50) can be reduced or eliminated. As a result, in the molding process using a two piece molding die or in the injection molding process defining a parting plane intermediate between the first side surface (45) and the second side (46) surface and in parallel with these side surfaces, the elastic deformation of the tongue (50) can be reduced or minimized when removing the molded product from the mold, and the removing of the molded product from the mold can be facilitated.

Preferably, the deflector main body (40) and the component piece (60) are formed with an engagement recess (52, 53) and a corresponding engagement projection (66, 67) that are configured to engage with each other to fixedly secure the deflector main body (40) and the component piece (60) to each other.

According to this arrangement, the positioning of the component piece (60) with respect to the deflector main body (40) can be accurately and reliably determined by the positive engagement between the engagement recess (52, 53) and the engagement projection (66, 67).

The ball screw mechanism according to the present invention includes such a deflector (13).

Effect of the Invention

According to this arrangement, because the tongue is integrally formed with the deflector main body which is directly fitted to the nut, any positional error that may be created owing to the assembly process between the deflector main body and the component piece is prevented from affecting the positional precision of the tongue relative to the nut. Thereby, the positional precision of the tongue relative to the ball rolling passage can be improved. As a result, any failure to properly recirculate the balls owing to a positional error in the tongue can be avoided, and any damage to the tongue can be avoided.

BRIEF DESCRIPTION OF THE DRAWING(S)

DESCRIPTION OF THE PREFERRED EMBODIMENT(S)

A ball screw mechanism and a deflector embodying the present invention are described in the following with reference to the appended drawings.

Figure 1:
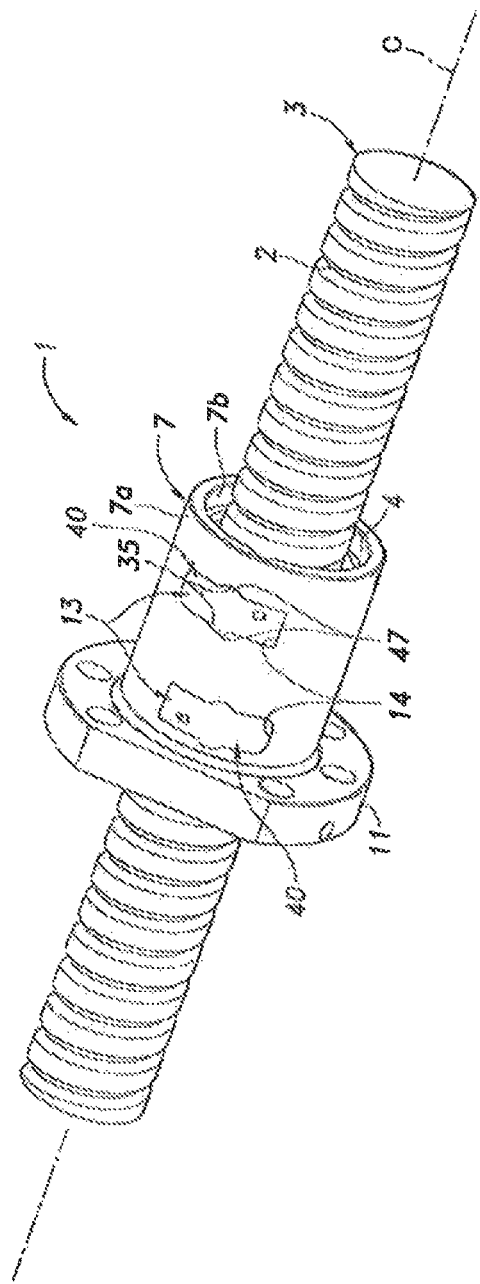
FIG. 1 is a perspective view of the ball screw mechanism incorporated with deflectors of the present invention.
Figure 2:
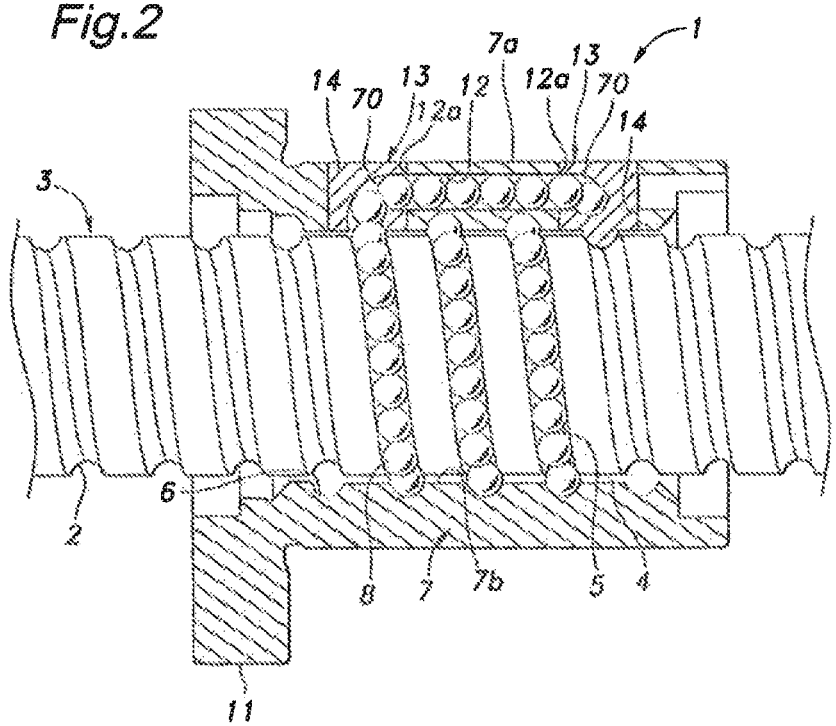
FIG. 2 is a fragmentary sectional view of the ball screw mechanism.
Figure 3:
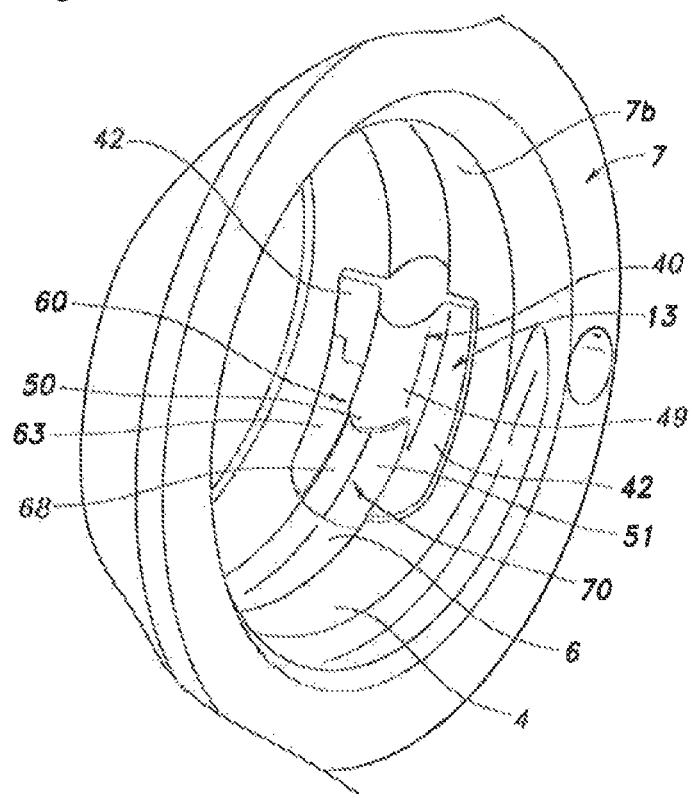
FIG. 3 is a fragmentary perspective view showing the inner circumferential surface side of the nut of the ball screw mechanism.

As shown in FIGS. 1 and 2, the ball screw mechanism 1 essentially consists of a screw shaft 3 having a spiral thread groove (screw shaft side thread groove) 2 formed on the outer circumferential surface thereof, a nut 7 having a through hole 4 for receiving the screw shaft 3 therein and a spiral thread groove (nut side thread groove) 6 formed on the inner circumferential surface 7b thereof to define a ball rolling passage 5 (see FIG. 2) in cooperation with the thread groove 2, and a plurality of balls 8 (see FIG. 2) consisting of steel balls received in the nut 7.

The screw shaft 3 consists of a metallic rod member (made of chromium molybdenum steel in the illustrated embodiment) having the screw thread groove 2 of a prescribed lead angle and a pitch formed on the outer circumferential surface thereof. The nut 7 is similarly made of a metallic cylinder member having the thread groove 6 of the same lead angle and pitch as the screw thread groove 2 formed on the inner circumferential surface thereof. The screw thread grooves 2 and 6 both have a gothic arch cross section. The materials and the configurations of the screw shaft 3 and the nut 7 can be varied without departing from the spirit of the present invention.

The nut 7 is formed with a ball return passage 12 (see FIG. 2) extending linearly in the axial direction (see the central axial line C of FIG. 1) thereof and having a circular cross section. A pair of receiving holes 14 of an identical shape are formed in a pair of axially intermediate parts (corresponding to the respective ends of the ball return passage 12) of the nut 7 in an axially spaced apart relationship to receive a pair of identically shaped side deflectors 13 (recirculation members), respectively. An axial end of the nut 7 is integrally provided with a mounting flange 11 extending radially outward and having a circular shape.

Figure 10:
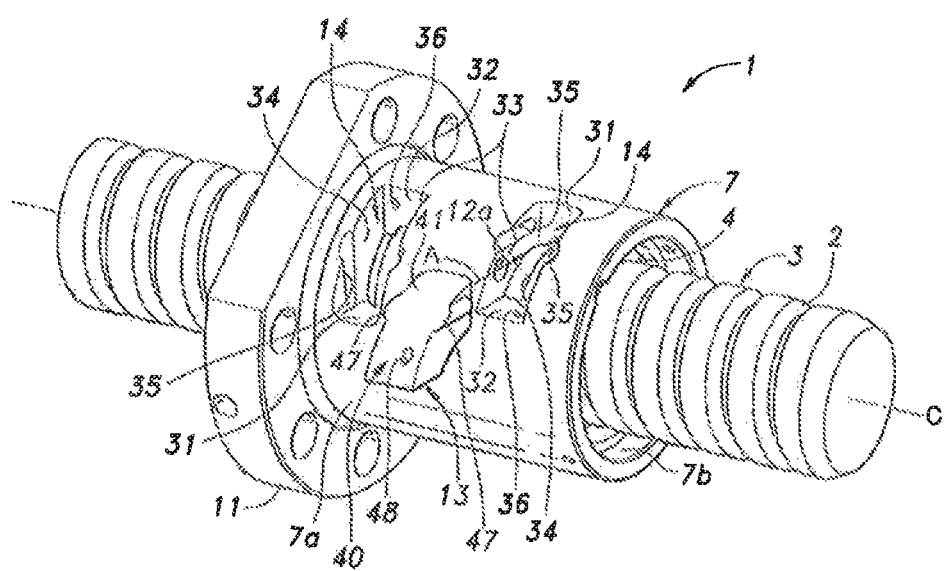
FIG. 10 is a perspective view showing the procedure for fitting one of the side deflectors into a receiving hole of the nut.

As shown in FIG. 10, the two receiving holes 14 are each defined by four end surfaces including a first end surface 31 and a second end surface 32 extending in parallel with the central axial line C and defining a 90 degree angle relative to each other around an axial line extending in parallel with the central axial line C, and a first side surface 33 and a second side surface 34 extending in parallel with a hypothetical plane perpendicular to the central axial line C and axially opposing each other. Each receiving hole 14 opens out at the outer circumferential surface 7a of the nut 7 at the radially outer end thereof, and opens out at the inner circumferential surface 7b of the nut 7 or into the through hole 4 at the radially inner end thereof, and thus defines a part of an annular space. The two receiving holes 14 are oriented in a mutually reversed relationship by 180 degrees.

In the illustrated embodiment, the first end surfaces 31 of the two receiving holes 14 are at an angle of 90 degrees relative to each other, and so are the second end surfaces 32 of the two receiving holes 14.

An end 12a of the ball return passage 12 (see FIG. 2) opens out at the first side surface 33, and an end of a pin insertion hole 36 opens out at the second end surface 32 in a perpendicular direction.

The first side surface 33 and the second side surface 34 are each formed with a guide groove 35 having a semi-circular cross section and extending linearly from the outer circumferential surface 7a of the nut 7 to a point adjoining the first end surface 31. The two guide grooves 35 of each receiving hole 14 extend in parallel with each other, and also in parallel with the direction of inserting the deflector 13 into the receiving hole 14 and to the second end surface 32.

Each receiving hole 14 opens out in an axially intermediate part of the outer circumferential surface 7a of the nut 7. The receiving hole 14 which is defined by these surfaces 31 to 34 can be formed by using a suitable machine tool without changing the tool during the process (or can be formed in a single machining process). Therefore, the forming of the receiving hole 14 is simplified, and a high level of machining precision can be achieve in machining these four surfaces because of the elimination of errors than could occur when replacing the tool.

Referring to FIGS. 4 to 9, the side deflector 13 is described in the following. For the convenience of description, the up and down, fore and aft, and right and left of the side deflector 13 are defined as indicated by the arrows in FIGS. 4 to 9.

The side deflector 13 may also be called as middle deflector, and is an assembly of a deflector main body 40 made of an injection molded plastic member, and a component piece 60 also made of an injection molded plastic member. The material for the deflector main body 40 and the component piece 60 may be selected from various kinds of engineering plastic materials such as polyacetal resin and reinforced polyamide resin.

Figure 5:
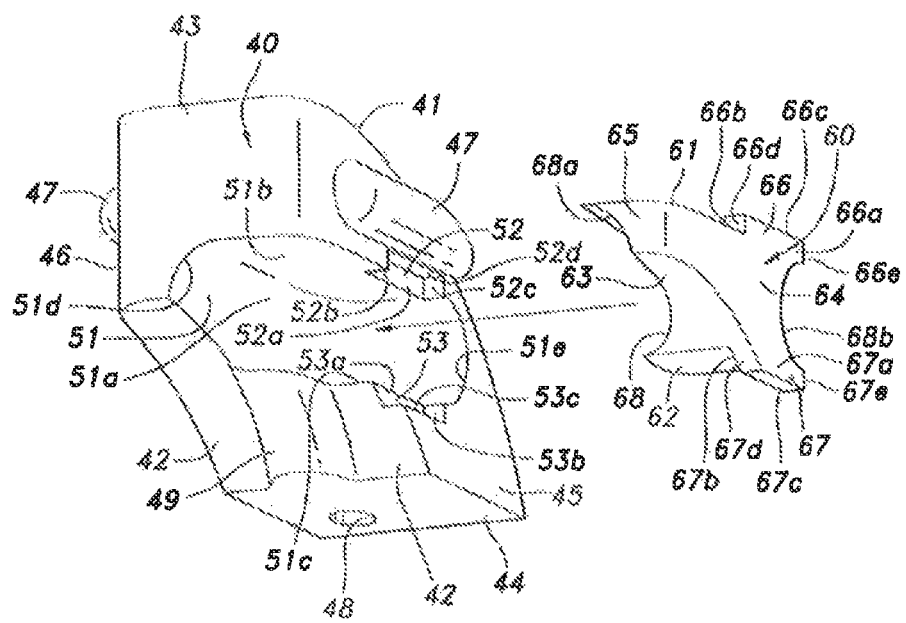
FIG. 5 is an exploded perspective view of the deflector.

The side deflector 13 is separated into the deflector main body 40 and the component piece 60 by a separation plane perpendicular to the central axial line C of the nut 7 so that the component piece 60 can be assembled to the deflector main body 40 in the axial direction of the nut 7 as shown in FIG. 5.

The deflector main body 40 accounts for a most part of the side deflector 13, and as shown in FIGS. 4 to 8, is provided with an outer circumferential surface 41 consisting of an arcuate surface having a same radius as the outer circumferential surface 7a of the nut 7, an inner circumferential surface 42 consisting of an arcuate surface having a slightly smaller radius than the inner circumferential surface 7b of the nut 7, a first end surface (front surface) 43 and a second end surface (lower surface) 44 which are both planar, and extend at an angle of 90 degrees relatively to each other and in parallel with the axial line, and a first side surface 45 and a second side surface 46 which are both planar and extend in parallel with the axial direction of the nut 7 in an axially spaced apart relationship. Therefore, the deflector main body 40 is shaped as a hexahedron which forms a segment of an annulus.

Figure 4:
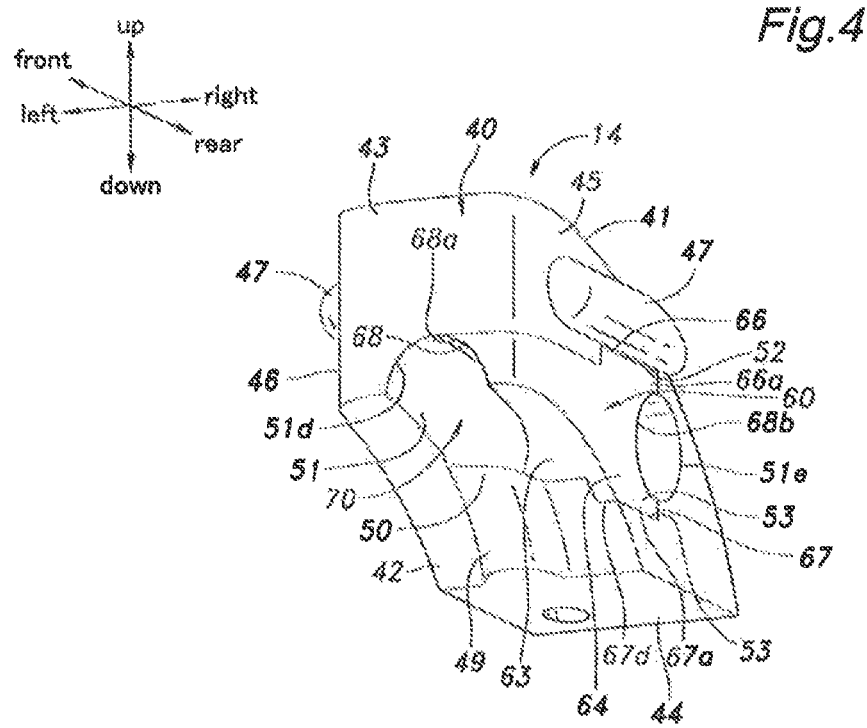
FIG. 4 is a perspective view of one of the deflectors embodying the present invention.
Figure 8:
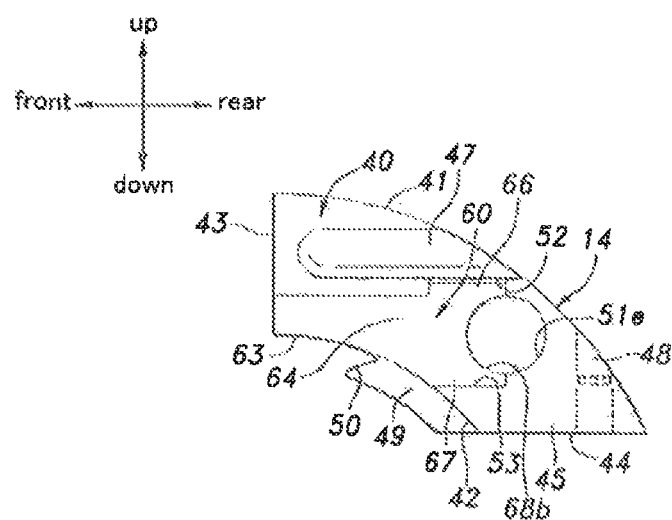
FIG. 8 is a side view of the deflector.

The fore and aft positioning of the deflector main body 40 with respect to the nut 7 (as seen in FIGS. 4 and 8) is accomplished by the abutting of the first end surface 43 thereof with the first end surface 31 of the receiving hole 14. The lateral (the axial direction of the nut 7) positioning of the deflector main body 40 with respect to the nut 7 is accomplished by abutting the first side surface 45 and the second side surface 46 thereof (which are parallel to each other) with the first side surface 33 and the second side surface 34 of the receiving hole 14 (which are parallel to each other), respectively, in a tight fit.

A pair of guide ridges 47 each having a substantially semicircular cross section are formed on the first side surface 45 and the second side surface 46, respectively. The guide ridges 47 extend linearly along the first side surface 45 and the second side surface 46, respectively, from the edges adjoining the outer circumferential surface 41 to the edges adjoining the first end surface 43, in a parallel relationship to the second end surface 44. The guide ridges 47 are shaped in a complementary manner to the guide grooves 35. Thus, the guide ridges 47 extend in the direction of inserting the deflector 13 into the receiving hole 14 such that the guide ridges 47 are engaged by the corresponding guide grooves 35 in a slidable manner in the lengthwise direction. Therefore, the guide ridges 47 guide the insertion of the deflector 13 in the receiving hole 14 in such a manner that the deflector main body 40 is positioned with respect to the nut 7 in the vertical direction as seen in FIGS. 4 and 8.

The term "positioning" as used here means that a component such as the deflector main body 40 is held stationary in a prescribed position such as the nut 7.

The deflector main body 40 is formed with a pin insertion hole 48 extending in a (vertical) direction perpendicular to the second end surface 44, and having one end opening out at the second end surface 44 and another end opening out at the outer circumferential surface 41. The pin insertion hole 48 coaxially aligns with the pin insertion hole 36 of the nut 7 when the deflector main body 40 is properly fitted to the nut 7. A spring pin 80 (see FIG. 9) is passed through the pin insertion hole 48 of the deflector main body 40 and the insertion hole 36 of the nut 7 so that the deflector main body 40 is fixedly secured to the nut 7 against the fore and aft movement as seen in FIGS. 4 and 8.

The deflector main body 40 is fitted to the prescribed position of the nut 7 in this manner. In other words, the deflector main body 40 is directly positioned relative to the nut 7, and fitted thereto under this condition.

The inner circumferential surface 42 of the deflector main body 40 is integrally formed with a ridge 49 extending in the circumferential direction and having a substantially semi-circular cross section such that the ridge 49 projects into the thread groove 2 of the screw shaft 3 defining a small gap with respect to the thread groove 2 when the deflector main body 40 is fitted to the nut 7. An end of the ridge 49 on the side of a main body side ball guide groove 51 (which is described hereinafter) is formed as a tongue 50 extending toward the thread groove 2. The tongue 50 is thus entirely integral with the deflector main body 40. The part of the tongue 50 facing the main body side ball guide groove 51 is formed as an arcuate surface or a scoop surface 50*a* that is smoothly connected to a groove bottom surface 51*a* of the ball guide groove 51 as shown in FIG. 7 so that the balls 8 may be scooped up from the main body side ball guide groove 51. More specifically, the tongue 50 is provided with an arcuate cross section, and the midpoint M (see FIG. 6) of the arc defined by the tongue 50 is offset toward the groove bottom surface 51*a* or away from the open side of the main body side ball guide groove 51 (to the right).

The fact that the midpoint M is offset toward the groove bottom surface 51*a* provides the advantage of minimizing or eliminating the overhang of a part of the tongue 50 on the side of the first side surface 45 which is created owing to the arcuate configuration of the tongue 50. This fact also contributes to the reduction or elimination of the elastic deformation which the tongue 50 must undergo in removing the molded deflector main body 40 from the mold so that the work in removing the molded deflector main body 40 from the mold can be facilitated. This fact further contributes to improving the guide action for passing the balls 8 scooped up from the ball rolling passage 5 by the tongue 50 from the ball rolling passage 5 to the ball return passage 12.

The deflector main body 40 is formed with the main body side ball guide groove 51 opening out at the first side surface 45 (the right side surface). The main body side ball guide groove 51 includes the groove bottom surface 51*a* extending from the inner circumferential surface 42 and the first end surface 43, and bending toward the first side surface 45 in the shape of letter L (or an elbow) while planar groove side surfaces 51*b* and 51*c* extend in parallel with the second end surface 44 such that the main body side ball guide groove 51 opens out at the first side surface 45. The section of the main body side ball guide groove 51 extending from the open end at the first end surface 43 to the junction with the tongue 50 is provided with only one of the groove side surfaces 51*b*, and the section of the main body side ball guide groove 51 extending from the junction with the tongue 50 to the open end at the first side surface 45 is provided with both of the groove side surfaces 51*b* and 51*c*.

In the illustrated embodiment, so as to define a part of the cross section of a ball guide passage 70 (which will be described hereinafter) or the section perpendicular to the lengthwise direction of the ball guide passage 70) over the entire length thereof, the groove bottom surface 51*a* substantially defines a quarter of a circle in the section extending from the open end at the first end surface 43 and the junction with the tongue 50 owing to the absence of the groove side surface 51*c*, and a half of a circle (semicircular configuration) in the section extending from the junction with the tongue 50 to the open end at the first side surface 45 owing to the presence of both of the groove side surfaces 51*b* and 51*c*. Therefore, the open end 51*d* of the main body side ball guide groove 51 at the first end surface 43 is substantially a quarter of a circle, and the open end 51*e* of the main body side ball guide groove 51 at the first side surface 45 is substantially a half of a circle.

The corners defined between the first side surface 45 and the groove side surface 51*b*, and between the first side surface 45 and the groove side surface 51*c* are respectively formed with engagement recesses 52 and 53. As shown in FIGS. 5 and 7, one of the engagement recess 52 is given with a rectangular shape defined by a bottom surface 52*a* slightly sunken with respect to the first side surface 45, a first end surface 52*b* and a second end surface 52*c* consisting of planes that are located at the front and rear ends of the bottom surface 52*a*, respectively, and a planar upper surface 52*d* located at the upper end of the bottom surface 52*a*. The bottom surface 52*a* is parallel to the first side surface 45, and the first end surface 52*b* and the second end surface 52*c* are in parallel with the first end surface 43. The upper surface 52*d* is in parallel with the second end surface 44. As shown in FIGS. 5 and 7, the other engagement recess 53 is given with a rectangular shape defined by a bottom surface 53*a* slightly sunken with respect to the first side surface 45, an end surface 53*b* consisting of a plane that is located at the rear end of the bottom surface 53*a*, and a lower side surface 53*c* located at the lower end of the bottom surface 53*a*, and opens out at the inner circumferential surface 42 at the front end thereof. The bottom surface 53*a* is in parallel with the first side surface 45, the end surface 53*b* is in parallel with the first end surface 43, and the lower side surface 53*c* is in parallel with the second end surface 44.

Figure 9:
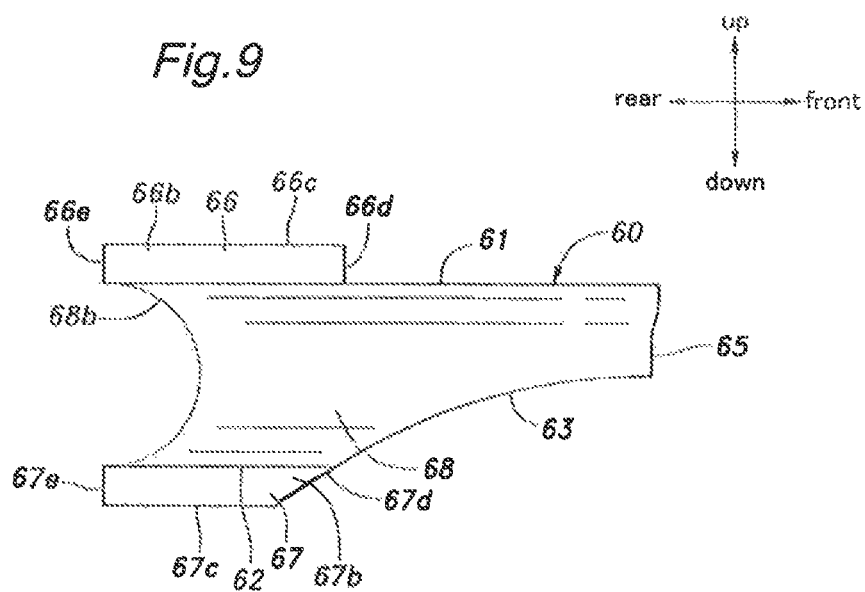
FIG. 9 is an enlarged side view of a component piece of the deflector.

As shown in FIGS. 5 and 9, the component piece 60 is provided with a planar first side surface 61 on an upper side thereof, a planar second side surface 62 on a lower side thereof in parallel with the first side surface 61, an arcuate surface 63 continuously connected to the inner circumferential surface 42 of the deflector main body 40 when fitted to the deflector main body 40, a planar third side surface 64 on the right side thereof, and a first end surface 65 on the front side thereof.

The first side surface 61 is formed with an upwardly projecting engagement projection 66. The engagement projection 66 is provided with a planar first side surface 66*a* flush with the third side surface 64, a planar second side surface 66*b* parallel to the first side surface 66*a*, a planar third side surface 66*c* parallel to the first side surface 61, a planar first end surface 66*d* located on the front side thereof and perpendicular to the first side surface 66*a*, the second side surface 66*b* and the third side surface 66*c*, and a planar second end surface 66*e* located on the rear side thereof and parallel to the first end surface 66*d* so as to define a rectangular shape which is complementary to the engagement recess 52. The second side surface 62 is formed with a downwardly projecting engagement projection 67. The engagement projection 67 is provided with a planar first side surface 67*a* flush with the third side surface 64, a planar second side surface 67*b* parallel to the first side surface 67*a*, a planar third side surface 67*c* parallel to the second side surface 62, an arcuate first end surface 67*d* located on the front side thereof, and a planar second end surface 67*e* located on the rear side thereof and perpendicular to the first side surface 67*a*, the second side surface 67*b* and the third side surface 67*c*, so as to define a rectangular shape which is complementary to the engagement recess 53. The first end surface 67d is smoothly and continuously connected to the arcuate surface 63.

The component piece 60 is fitted to the deflector main body 40 in such a manner that the first side surface 61 abuts the groove side surface 51b, the second side surface 62 abuts the groove side surface 51c, the engagement projection 66 is received by the engagement recess 52, and the engagement projection 67 is received by the engagement recess 53.

In this assembled state, the second side surface 66b of the engagement projection 66 closely abuts the bottom surface 52a of the engagement recess 52, and the second side surface 67b of the engagement projection 67 abuts the bottom surface 53a and the engagement recess 53 so that the lateral position (the axial direction of the nut 7) of the component piece 60 relative to the deflector main body 40 is determined. The third side surface 66c of the engagement projection 66 closely abuts the side surface 52d of the engagement recess 52, and the third side surface 67c of the engagement projection 67 closely abuts the side surface 53c of the engagement recess 53 so that the vertical position of the component piece 60 relative to the deflector main body 40 is determined. The first end surface 66d and second end surface 66e of the engagement projection 66 closely abut the end surfaces 52b and 52c of the engagement recess 52, respectively, so that the fore and aft position of the component piece 60 relative to the deflector main body 40 is determined. In this manner, the component piece 60 can be fitted to the prescribed position of the deflector main body 40. In other words, owing to the engagement between the engagement recesses 52 and 53, and the engagement projections 66 and 67, the component piece 60 can be positioned to the deflector main body 40 without any variations and at a high precision without fail.

Thus, the plane perpendicular to the central axial line C of the nut 7 or the bottom surface 52a—the second side surface 66b, and the bottom surface 53a—the second side surface 67b define the parting plane between the deflector main body 40 and the component piece 60.

Figure 6:
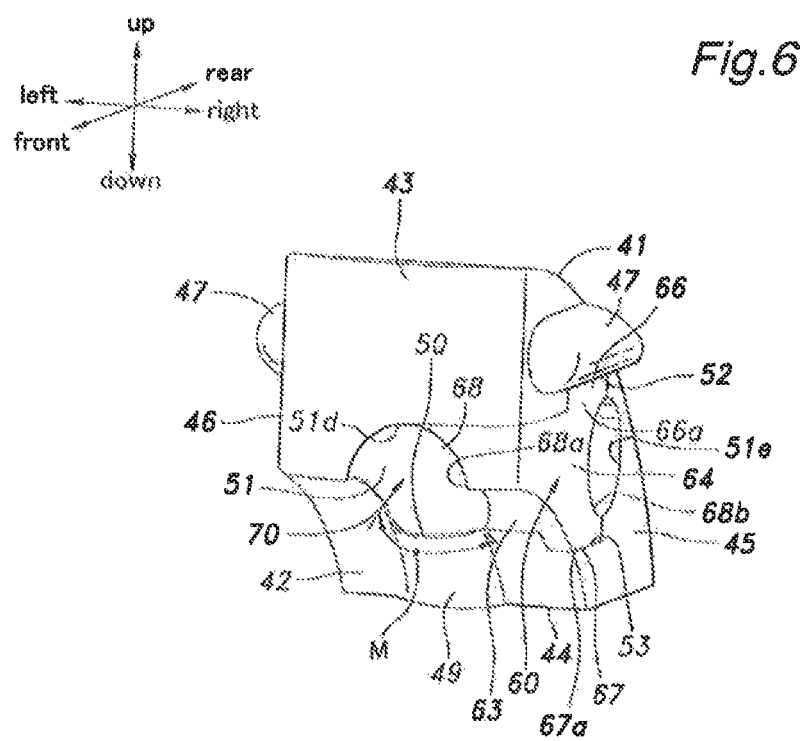
FIG. 6 is a perspective view of the deflector from a different direction.
Figure 7:
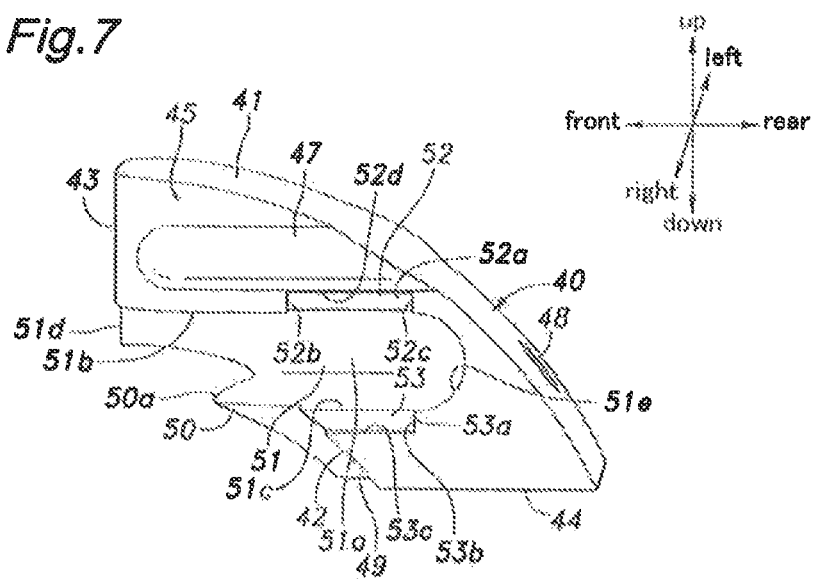
FIG. 7 is a perspective view of a deflector main body of the deflector.

As shown in FIGS. 4 and 6, when the component piece 60 is assembled to the deflector main body 40, the third side surface 64 and the first side surfaces 66a and 67a are flush with the first side surface 45. Therefore, one of the side surfaces of the deflector 13 jointly formed by the deflector main body 40 and the component piece 60 facing the axial direction of the nut 7 is entirely defined by second side surface 46 of the deflector main body 40 while the other side surface of the deflector 13 is defined by the first side surface 45 of the deflector main body 40, and the third side surface 64 and the first side surfaces 66a and 67a of the component piece 60, and these overall side surfaces are parallel to each other.

Thus, the component piece 60 is clamped between the nut 7 and the deflector main body 40, and is held immobile in the axial direction of the nut 7 owing to the fact that the second side surface 46 abuts the second side surface 34 of the receiving hole 14, and the first side surface 45, the third side surface 64, and the first side surfaces 66a and 67a abut the first side surface 33 of the receiving hole 14 without requiring any special fixing member or a fixing mechanism for fixedly securing the component piece 60.

The component piece 60 is formed with a component piece side ball guide groove 68 opening out at the left side surface thereof in a perpendicular direction relative to the left side surface. The component piece side ball guide groove 68 extends from the first end surface 65, and bends toward the third side surface 64 in the shape of letter L (elbow), and forms the remaining part (the part of the ball guide passage 70 which is not defined by the main body side ball guide groove 51) of the cross section of the ball guide passage 70 (which will be described hereinafter) so as to form the entire length of the ball guide passage 70 in cooperation with the main body side ball guide groove 51. In the illustrated embodiment, the component piece side ball guide groove 68 defines a substantially a quarter of a circle in the section thereof which is in parallel with the third side surface 64, and substantially defines a half of a circle in the section thereof which is bent from the said section and remote from the first end surface 65. Therefore, the open end 68a of the component piece side ball guide groove 68 at the first end surface 65 substantially defines a quarter of a circle, and the open end 51e of the component piece side ball guide groove 68 at the third side surface 64 defines a half of a circle.

When the component piece 60 is fitted to the deflector main body 40 as described above, the main body side ball guide groove 51 and the component piece side ball guide groove 68 jointly define the ball guide passage 70. The ball guide passage 70 consists of an L-shaped bent passage having one end opening out at the first end surface 43 and the other end opening out at the first side surface 45. The part of the open end of the ball guide passage 70 at the first end surface 43 remote from the tongue 50 substantially defines a half of a circle jointly with the open end 51d of the deflector main body 40 and the open end 68a of the component piece 60, and the open end of the ball guide passage 70 at the first side surface 45 substantially defines a full circle jointly with the open end 51e of the deflector main body 40 and the open end 68b of the component piece 60. The open end (51e and 68b) of the ball guide passage 70 at the first side surface 45 aligns with the corresponding end 12a of the ball return passage 12. Thus, the ball guide passage 70 communicates with the ball return passage 12 (see FIG. 2), and performs the function of guiding the balls 8 scooped up by the tongue 50 to the ball return passage 12.

In other words, a circular opening jointly defined by the main body side ball guide groove 51 and the component piece side ball guide groove 68 opens out on one side (right side) of the side deflector 13 facing the axial direction of the nut 7 as a connecting end for the ball return passage 12, and the component piece 60 includes a pair of parts (consisting of the engagement projections 66 and 67) extending radially outwardly with respect to the circular opening so that the deflector main body 40 and the component piece 60 are joined to each other at the second end surfaces 52c and 53c, and the second end surfaces 66e and 67e that abut each other, respectively.

Thus, the shape of the opening serving as a connecting end for the ball return passage 12 can be accurately defined, and the positioning of the component piece 60 to the deflector main body 40 can be accomplished in a proper manner.

Because the side deflector 13 is formed jointly by the deflector main body 40 and the component piece 60 such that the ball guide passage 70 is jointly defined by the main body side ball guide groove 51 and the component piece side ball guide groove 68, the side deflector 13 internally provided with the direction changing passage bent in the shape of letter L can be manufactured in an efficient manner by using a two piece mold die assembly for molding the component piece 60 and a two piece mold die assembly for molding the deflector main body 40 without requiring complex die mold assemblies or using a complex molding process such as the lost wax process.

Because the deflector main body 40 and the component piece 60 are joined to each other at the interface which is perpendicular to the central axial line C of the nut 7, and the entire part of the tongue 50 is integrally formed with the deflector main body 40 which is directly positioned to the nut 7, any assembly error in assembling the component piece 60 to the deflector main body 40 does not affect the positional precision of the tongue 50 with respect to the nut 7. As a result, the positional precision of the tongue 50 with respect to the ball rolling passage 5 can be improved, and a favorable recirculation of the balls 8 can be ensured. Also, owing to such improvements in precision, the balls 8 are prevented from forcibly colliding with the tongue 50 so that damage to the tongue 50 can be avoided.

The procedure of fitting the side deflector 13 to the nut 7 is described in the following with reference to FIGS. 10 to 12.

As shown in FIG. 10, the side deflector 13 formed by combining the deflector main body 40 and the component piece 60 are positioned relative to the nut 7 such that the guide ridges 47 of the deflector 13 align with the respective guide grooves 35 of the nut 7, and while sliding the guide ridges 47 along the guide grooves 35, the side deflector 13 is inserted into the receiving hole 14 from radially outside of the nut 7 as indicated by arrow A in FIG. 10 (the lengthwise direction of the guide grooves 35).

The limit of inserting the side deflector 13 in the receiving hole 14 is determined by the abutting of the first end surface 43 of the deflector main body 40 onto the first end surface 31 defining the receiving hole 14. Owing to this arrangement, the positional precision of the side deflector 13 with respect to the nut 7 can be accomplished in a highly precise manner simply by ensuring the fitting precision between the guide grooves 35 and the guide ridges 47 (or the machining precision for the guide grooves 35 and the guide ridges 47) and the abutting precision between the first end surface 31 of the receiving hole 14 and the first end surface 43 of the side deflector 13 (or the machining precision of the first end surface 31 and the first end surface 43) without regard to the precision of other surfaces defining the side deflector 13 and the receiving hole 14.

Figure 11:
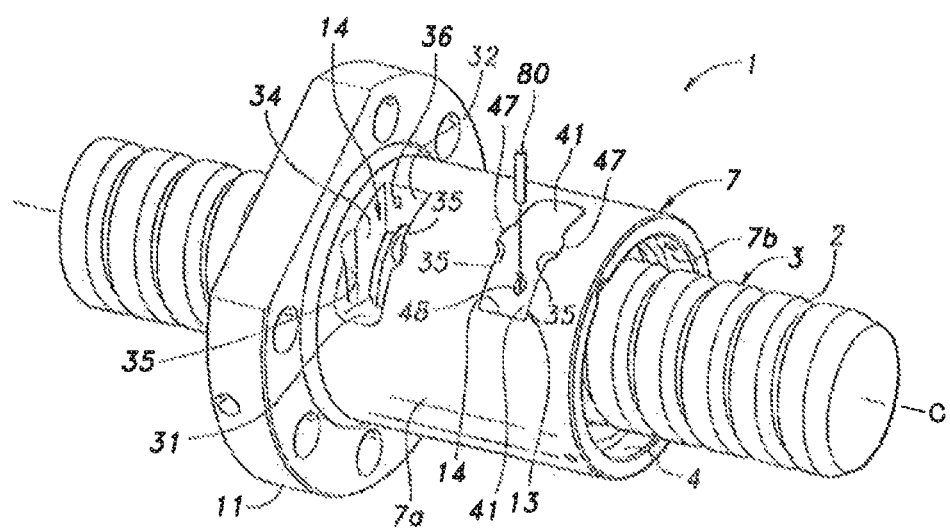
FIG. 11 is another perspective view showing the procedure for fitting the side deflector into the receiving hole of the nut.
Figure 12:
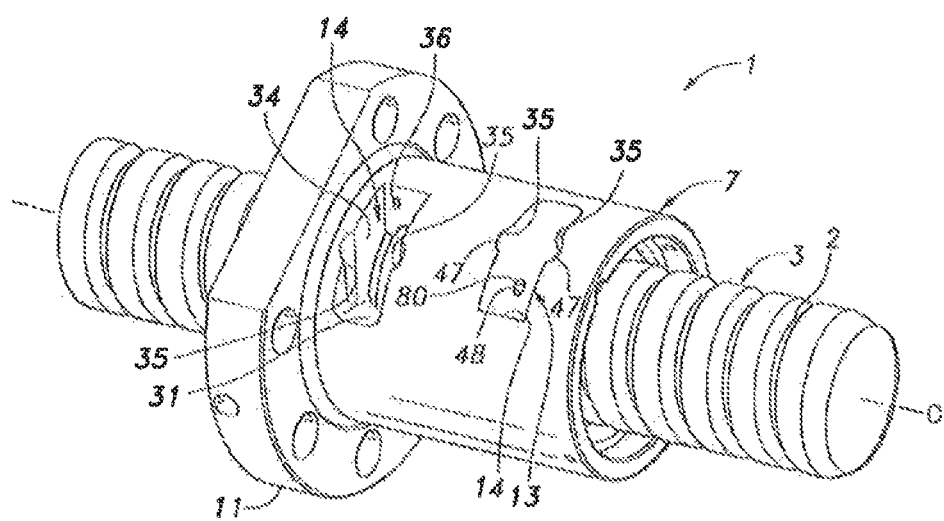
FIG. 12 is yet another perspective view showing the procedure for fitting the side deflector into the receiving hole of the nut.

FIG. 11 shows the ball screw mechanism when the side deflector 13 is fully inserted in the receiving hole 14. Upon completion of the insertion, a cylindrical spring pin 80 is inserted in the pin insertion hole 48 of the side deflector 13 until the free end of the spring pin 80 reaches the pin insertion hole 36 of the nut 7 so that the spring pin 80 extends through both of the pin insertion holes 48 and 36. As a result, the deflector main body 40 is fixedly secured to the nut 7. In this secured state, the component piece 60 is interposed between the nut 7 and the deflector main body 40 so as to be axially immovable with respect to the nut 7. FIG. 12 shows the state where the spring pin 80 is fully inserted in both of the pin insertion holes 48 and 36.

The present invention has been described in terms of a specific embodiment, but this embodiment is only exemplary, and does not limit the present invention in any way. The material for the deflector main body 40 and the component piece 60 is not limited to the plastic material, but may also be any other per se known material such as metallic material. However, the use of plastic material provides the advantage of reducing the manufacturing cost as compared to other materials such as metallic materials.

The mode of fitting and fixedly securing the side deflector 13 to the nut is not limited to those using the guide grooves 35 and the guide ridges 47 or using the spring pin 80, but may also be those that do not use the guide grooves 35 and the guide ridges 47 for inserting the side deflector 13 into the receiving hole 14 or those that use a fastener such as a screw for fixedly securing the side deflector 13 in the receiving hole 14. If desired, the side deflector 13 may be press fitted into the receiving hole 14 of the nut 7. The shapes of the side deflector 13 and the receiving hole 14 may also be varied without departing from the spirit of the present invention, and may also consist of wedge shapes which are tapered toward the inner end thereof. The position of the free end of the tongue 50 is important, but it suffices if the free end thereof is entirely formed by a part of the deflector main body 40. A pair of such side deflectors 13 are provided for each nut 7 in the illustrated embodiment, but only one such deflector 13 may also be used for each nut 7 without departing from the spirit of the present invention.

The deflector of the present invention is most advantageously applied to a side deflector, but may also be applied to an end deflector which is configured to the attached to an axial end of the nut without departing from the spirit of the present invention.

The various components of the illustrated embodiment are not entirely essential for the present invention, some of the components thereof may be omitted and/or substituted without departing from the spirit of the present invention.

Glossary of Terms 1 ball screw mechanism
2 thread groove
3 screw shaft
5 ball rolling passage
6 thread groove
7 nut
8 ball
12 ball return passage
13 side deflector
14 receiving hole
35 guide groove
36 pin insertion hole
40 deflector main body
47 guide ridge
48 pin insertion hole
49 ridge
50 tongue
51 main body side ball guide groove
52 engagement recess
53 engagement recess
60 component piece
66 engagement projection
67 engagement projection
68 component piece side ball guide groove
70 ball guide passage
80 spring pin

The invention claimed is:

1. A deflector for a ball screw mechanism having a ball rolling passage defined by a thread groove formed on an outer circumferential surface of a screw shaft and a thread groove formed on an inner circumferential surface of a nut, the deflector being configured to be fitted into the nut to guide a plurality of balls from the ball rolling passage to a ball return passage formed in the nut, the deflector comprising:

a deflector main body having an inner circumferential surface integrally formed with a ridge having a substantially semicircular cross section and extending in a circumferential direction such that the ridge projects into the thread groove of the screw shaft when the deflector main body is fitted to the nut, a tongue extending toward the ball rolling passage for scooping up the balls from the ball rolling passage where the tongue is formed by an end of the ridge on a side of a main body side ball guide groove, and where the main body side ball guide groove defines a part of a ball guide passage for guiding the balls scooped up by the tongue to the ball return passage, the deflector main body being configured to be fixedly secured to a prescribed position of the nut by engaging with a part of the nut, and a component piece having a component piece side ball guide groove defining a remaining part of the ball guide passage to define the ball guide passage jointly with the main body side ball guide groove, the component piece being configured to be fitted to a prescribed position of the deflector main body by engaging with a part of the deflector main body, wherein the deflector main body and the component piece are configured to be joined in an axial direction of the nut, wherein the deflector is configured to be received in a receiving hole opening out at an outer circumferential surface of the nut from radially outside of the nut, and wherein the deflector is provided with a pair of mutually parallel side surfaces facing in the axial direction of the nut, and one of the side surfaces is defined solely by the deflector main body while the other side surface is jointly defined by the deflector main body and the component piece as a flush surface such that the component piece is held immobile in the axial direction of the nut by being interposed between the nut and the deflector main body in the receiving hole.

2. The deflector according to claim 1, wherein a circular opening jointly defined by the main body side ball guide groove and the component piece side guide groove opens out at the other side surface of the deflector facing in the axial direction of the nut as a junction with the ball return passage, and the component piece is provided with a radially outwardly extending part with respect to the circular opening at a portion adjoining the circular opening such that the radially outwardly extending part defines a radially outwardly extending surface with respect to the circular opening, the deflector main body and the component piece abutting each other at the radially outwardly extending surface and an opposing radially outwardly extending surface of the deflector main body.

3. The deflector according to claim 1, wherein the tongue is provided with an arcuate cross section, and a midpoint of an arcuate configuration of the tongue is offset toward a side remote from an open end of the main body side ball guide groove.

4. The deflector according to claim 1, wherein the deflector main body and the component piece are formed with an engagement recess and a corresponding engagement projection that are configured to engage with each other to fixedly secure the deflector main body and the component piece to each other.

5. A ball screw mechanism including the deflector according to claim 1.

6. The deflector according to claim 2, wherein the deflector main body is formed with a recess complementary to the radially outwardly extending part of the component piece, the opposing radially outwardly extending surface of the deflector main body being defined in the recess.

* * * * *